(12) United States Patent
Lin et al.

(10) Patent No.: US 8,094,712 B2
(45) Date of Patent: Jan. 10, 2012

(54) APPARATUS FOR PROCESSING A DATA STREAM HAVING A HIERARCHICAL LAYER STRUCTURE AND INCLUDING ENCODED DATA SETS AND RAW DATA SETS AND METHOD THEREOF

(75) Inventors: Chan-Shih Lin, Tainan County (TW); Shao-Yung Su, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 954 days.

(21) Appl. No.: 12/058,765

(22) Filed: Mar. 31, 2008

(65) Prior Publication Data

US 2009/0245670 A1    Oct. 1, 2009

(51) Int. Cl.
*H04N 11/02* (2006.01)
(52) U.S. Cl. .................................. 375/240.01
(58) Field of Classification Search .............. 375/240, 375/240.01, 240.26; 382/232, 235; 386/220
See application file for complete search history.

(56) References Cited

U.S. PATENT DOCUMENTS

| 5,764,658 | A | * | 6/1998 | Sekiguchi et al. | 714/752 |
| 7,218,676 | B2 | * | 5/2007 | Kono et al. | 375/240.25 |
| 2005/0147166 | A1 | * | 7/2005 | Shibata et al. | 375/240.15 |
| 2006/0233525 | A1 | * | 10/2006 | Shibata et al. | 386/95 |
| 2009/0100493 | A1 | * | 4/2009 | Jones et al. | 725/131 |

OTHER PUBLICATIONS

Advanced Television Systems Committee, Inc. "ATSC Digital Television Standard, Part 4—MPEG-2 Video System Characteristics (A/53, Part 4:2007)", Jan. 3, 2007, pp. 5, 9~18.

* cited by examiner

*Primary Examiner* — Dmitry H Levitan
(74) *Attorney, Agent, or Firm* — Winston Hsu; Scott Margo

(57) ABSTRACT

An apparatus for processing a data stream having a hierarchical layer structure and including encoded data sets and raw data sets is provided. The apparatus includes a first processing circuit for generating an enable signal corresponding to a predetermined layer of the hierarchical layer structure when detecting that a data set of the data stream corresponds to the predetermined layer, and a second processing circuit coupled to the first processing circuit for detecting whether an identifier of the data set corresponds to one predetermined raw data set identifier when receiving the enable signal from the first processing circuit.

16 Claims, 7 Drawing Sheets

| Bit | Access | Default | Description |
|---|---|---|---|
| 31-18 | RO | | Reserved |
| 17-16 | RO | | AFD valid flag |
| | | | 00- not valid |
| | | | 01-sequence layer |
| | | | 10-GOP layer |
| | | | 11-picture layer |
| 15-0 | RO | | AFD data |

AFD description

FIG. 6

| Bit | Access | Default | Description |
|---|---|---|---|
| 31-11 | RO | | Reserved |
| 10-9 | | | User data valid sector #N |
| | | | 00- not valid |
| | | | 01-sequence layer |
| | | | 10-GOP layer |
| | | | 11-picture layer |
| 8 | | | Continuous flag |
| | | | 0--individual section |
| | | | 1--continuous section from previous section (1) |
| 7-0 | RO | | Indicate the byte counts of user data in section 2 |

User data description

FIG. 7

APPARATUS FOR PROCESSING A DATA STREAM HAVING A HIERARCHICAL LAYER STRUCTURE AND INCLUDING ENCODED DATA SETS AND RAW DATA SETS AND METHOD THEREOF

BACKGROUND OF THE INVENTION

1. Field of the Invention

The present invention relates to data processing, and more particularly, to an apparatus for processing a data stream having a hierarchical layer structure and including encoded data sets and raw data sets and method thereof.

2. Description of the Prior Art

In current television specifications, a television program includes image frames and associated user data, such as an active format description. The user data is randomly inserted into a number of layers, such as the sequence layer, picture layer, and the group of picture layer. When decoding the television program in the conventional television program processing approach, however, the above-mentioned data need not be decoded because the data related to displaying the television program is not involved in decoding the image frames of the television program. As a result, when displaying the television program, the displaying device needs to retrieve the aforementioned data from the decoder.

Furthermore, the data is randomly allocated in the above-mentioned layers. So, the displaying device needs to spend considerable time in finding the data. Therefore, the conventional processing approach is very inconvenient and has low efficiency. In addition, the data not involved in decoding the encoded video frames are still fed into the decoder. This wastes the computation resources of the decoder and greatly degrades the performance of the decoder.

Thus, there is a need for an apparatus and method that provides an easier and more convenient way of processing the television program having user data incorporated therein.

SUMMARY OF THE INVENTION

It is therefore one of the objectives of the claimed invention to provide an apparatus and method for processing a data stream having a hierarchical layer structure and including encoded data sets and raw data sets, to solve the above-mentioned problems.

In accordance with an embodiment of the claimed invention, an apparatus for processing a data stream having a hierarchical layer structure and including encoded data sets and raw data sets is provided. The apparatus comprises a first processing circuit, for generating an enable signal corresponding to a predetermined layer of the hierarchical layer structure when detecting that a data set of the data stream corresponds to the predetermined layer, and a second processing circuit, coupled to the first processing circuit, for detecting whether an identifier of the data set corresponds to one predetermined raw data set identifier when receiving the enable signal from the first processing circuit.

In accordance with another embodiment of the present invention, a method for processing a data stream having a hierarchical layer structure and including encoded data sets and raw data sets is provided. The method comprises generating an enable signal corresponding to a predetermined layer of the hierarchical layer structure when detecting that a data set of the data stream corresponds to the predetermined layer, and detecting whether an identifier of the data set corresponds to one predetermined raw data set identifier when receiving the enable signal from a first processing circuit.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a diagram illustrating an active format description (AFD) register description table according to an embodiment of the present invention.

FIG. 7 is a diagram illustrating a user data register description table according to an embodiment of the present invention.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

In the disclosed invention, an apparatus for processing a data stream having a hierarchical layer structure and including encoded data sets and raw data sets utilizes two processing circuits, such as filters, to determine whether an identifier of the data set corresponds to one predetermined raw data set identifier. When a data stream is received, the apparatus automatically determines the identifier of the data set in the data stream and stores the associated data set into a storage device including a number of storage areas allocated for storing data corresponding to a plurality of predetermined raw data set identifiers respectively. Further details of the disclosed invention are given as follows.

Figure 1:
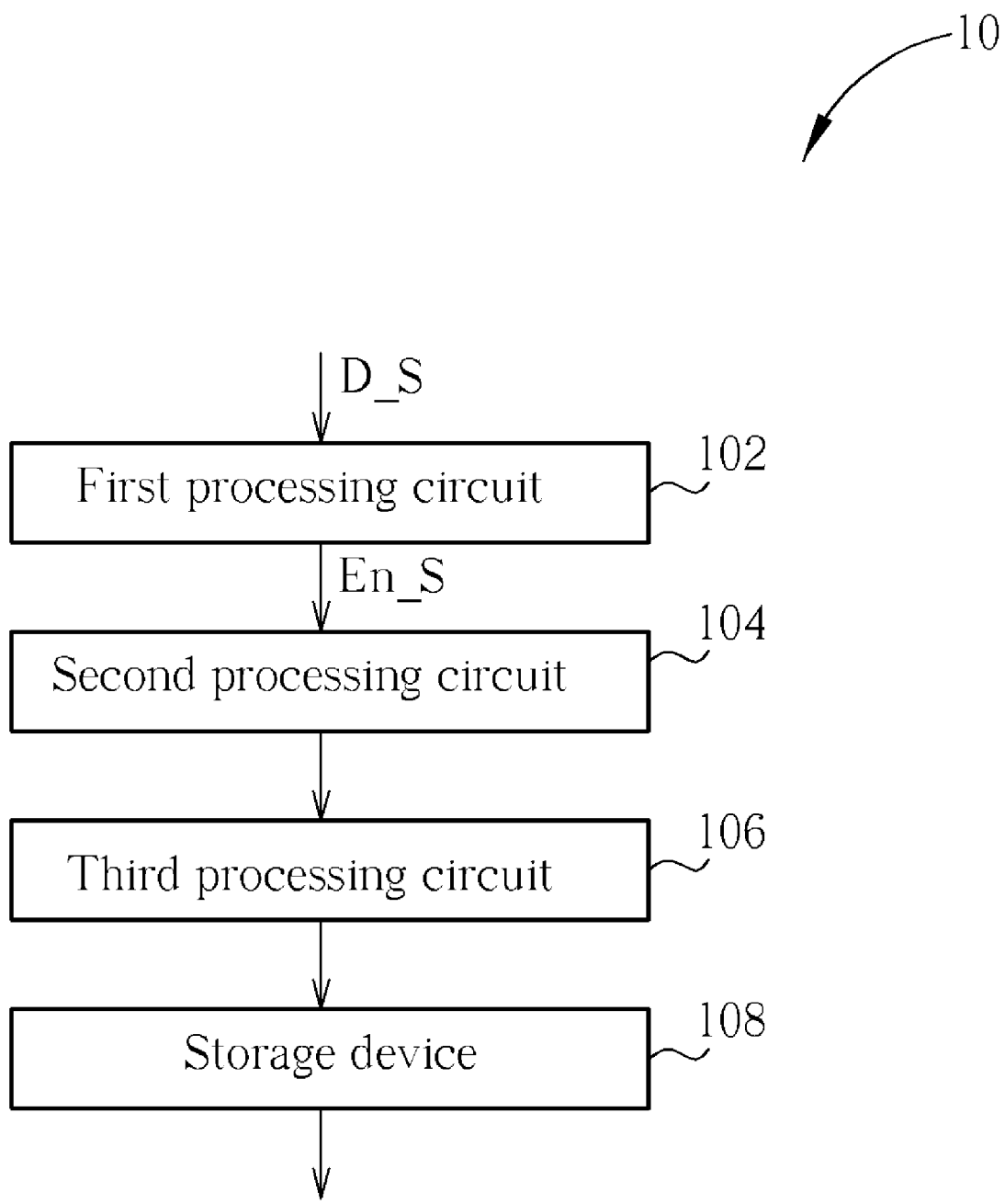
FIG. 1 is a block diagram of an apparatus for processing a data stream having a hierarchical layer structure and including encoded data sets and raw data sets according to an embodiment of the present invention.

Please refer to FIG. 1, which shows a block diagram of an apparatus 10 for processing a data stream having a hierarchical layer structure and including encoded data sets and raw data sets according to an embodiment of the present invention. The apparatus 10 comprises a first processing circuit 102, a second processing circuit 104, a third processing circuit 106 and a storage device 108. In this embodiment, after receiving the incoming data stream D_S (e.g., a digital television program stream complying with an MPEG-2 specification), the first processing circuit 102 generates an enable signal En_S corresponding to a predetermined layer of the hierarchical layer structure of the data stream D_S when detecting that a data set of the data stream D_S corresponds to the predetermined layer. In this embodiment, the first processing circuit 102 may parse a header of the predetermined layer to generate the enable signal En_S. Then, the first processing circuit 102 transmits the enable signal En_S to the second processing circuit 104. The second processing circuit 104 is coupled to the first processing circuit 102, for detecting whether an identifier of the data set corresponds to one predetermined raw data set identifier when receiving the enable signal En_S from the first processing circuit 104. Accordingly, when the second processing circuit 104 determines that the identifier of the data set corresponds to one predetermined raw data set identifier, the second processing circuit 104 notifies the third processing circuit 106 to process the data set. On the other hand, when the second processing circuit 104 fails to determine that the identifier of the data set corresponds to one predetermined raw data set identifier, the second processing circuit 104 notifies the third processing circuit 106 to discard the data set.

The storage device 108 includes a plurality of storage areas allocated for storing data corresponding respectively to a plurality of predetermined raw data set identifiers. Thus, after the third processing circuit 106 processes the data set, the third processing circuit 106 stores data extracted from the data set into a storage area (not shown) corresponding to the predetermined raw data set identifier. In one exemplary implementation of the present invention, when the aforementioned storage area is full, the third processing circuit 106 continues processing the data set to store data into another storage area in the storage device 108 that is originally allocated for storing data corresponding to another predetermined raw data set identifier. In another exemplary implementation of the present invention, when the aforementioned storage area is full, the third processing circuit 106 aborts processing the data set to discard the remaining data of the data set mentioned above.

Please note that the data stream mentioned above complies with a digital television specification, and the predetermined raw data set identifier is an active format description (AFD) identifier or a non-AFD identifier, such as digital video broadcasting (DVB), closed caption (CC) identifier, bar data identifier, or other format data identifier. In addition, the predetermined layer is selected from a group consisting of a sequence layer, a group of picture (GOP) layer, and a picture layer. As a result, the enable signal may be one of a sequence enable signal, a GOP enable signal, and a picture enable signal corresponding to the sequence layer, the GOP layer, and the picture layer respectively. Additionally, in the embodiment, the data stream complies with the MPEG-2 specification.

It should be noted that implementations of the first processing circuit 102, the second processing circuit 104, and the third processing circuit 106 may be a state machine, a multiplexer (MUX), a detector, a filter, or some other device, including one that may incorporate a combination of the mentioned device features. After reviewing this embodiment of the present invention, other applications and implementations will be obvious to those skilled in the art, and should be included within the scope of the present invention.

Figure 2:
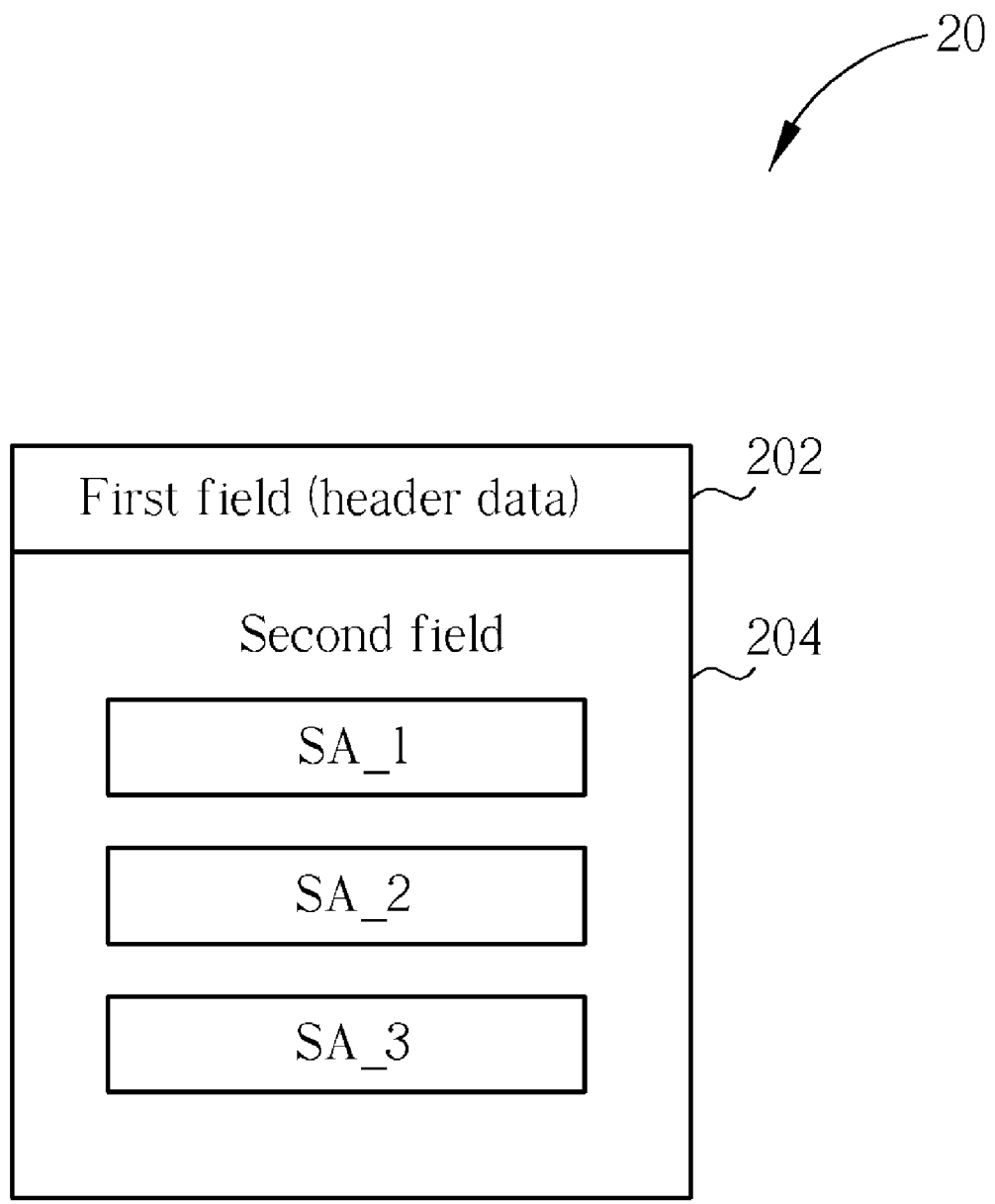
FIG. 2 is a diagram illustrating a storage device shown in FIG. 1.

Please refer to FIG. 2, which shows a diagram illustrating an exemplary embodiment of the storage device 108 shown in FIG. 1. As shown in FIG. 2, the storage device 108 comprises a first field 202 and a second field 204. The first field 202 is for storing header data containing a register description table recording information of the data sets stored in the second field 204. The second field 204 includes a plurality of storage areas SA_1, SA_2, SA_3 allocated for storing data corresponding to a plurality of predetermined raw data set identifiers respectively. For example, each of storage areas SA_1, SA_2, SA_3 has a size equal to 128 bytes. In addition, the above-mentioned storage area may be different sizes to meet different specifications and requirements. Since a skilled person can readily appreciate the operations of the storage device 108 after reading the above disclosure, further description is omitted here for the sake of brevity. In this embodiment, the storage device 108 may be a hard disc, a volatile memory, a non-volatile memory, a buffer, a flash, a DRAM, an SRAM, an SDRAM, or other devices, including one that may incorporate a combination of the mentioned device features. Moreover, the devices mentioned above are for illustrative purposes only and are not meant to be limitations of the present invention.

Additionally, in a preferred embodiment of the present invention (as shown in FIG. 2), the storage area SA_1 stores the AFD data, the storage area SA_2 stores the DVB data, and the storage area SA_3 stores other data (e.g., user definition data) such as sleep time, a volume setting, or recording time. In addition, if the size of the DVB data is bigger than the size of the storage area SA_2 (e.g., 128 bytes), the storage area SA_2 and the storage area SA_3 are combined to store the DVB data. It should be noted that the storage areas SA_1, SA_2, and SA_3 are for illustrative purposes only and are not meant to be limitations of the present invention.

Figure 3:
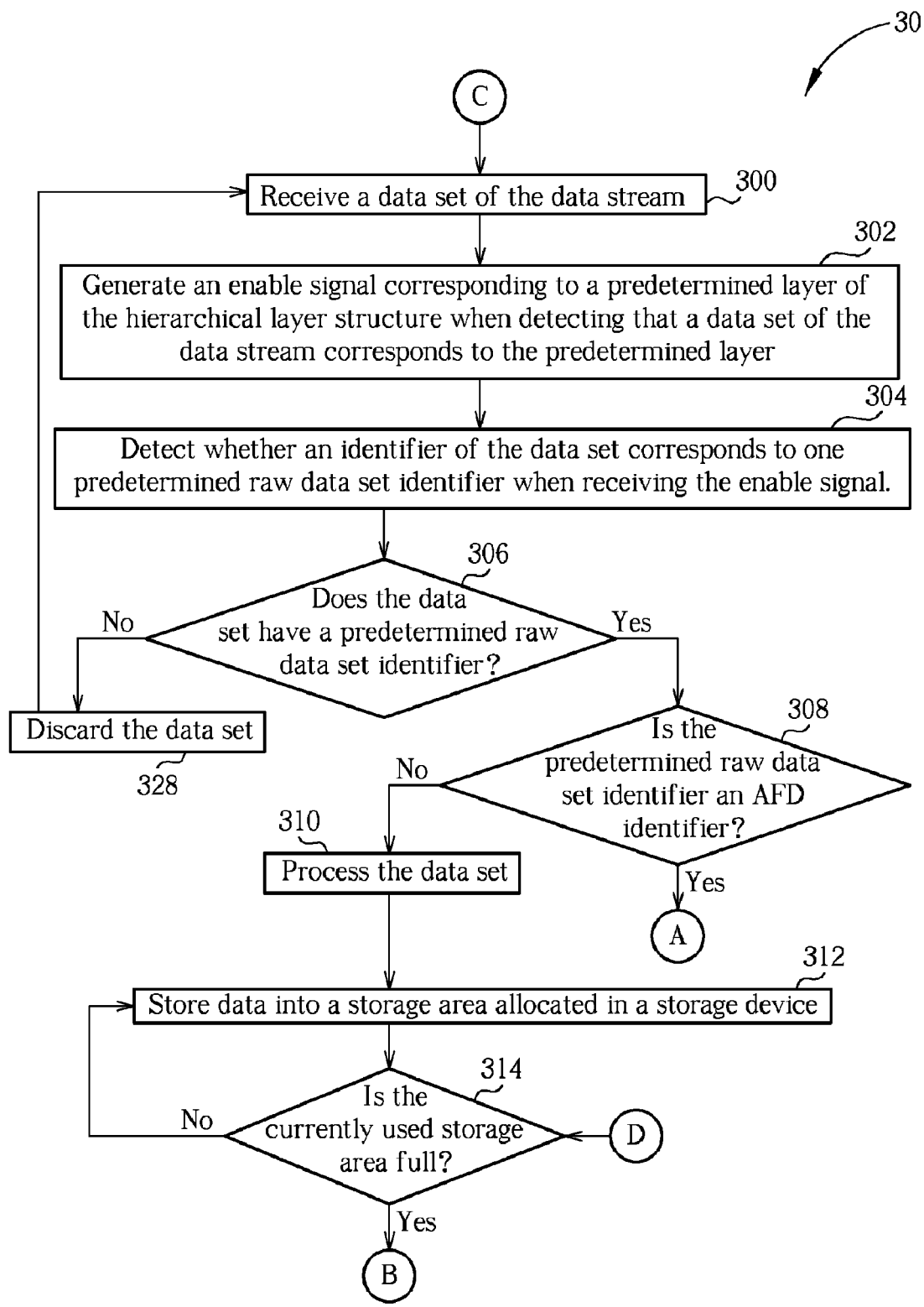
FIG. 3, FIG. 4, and FIG. 5 are subsequent flowcharts of a method for processing a data stream having a hierarchical layer structure and including encoded data sets and raw data sets according to an embodiment of the present invention.
Figure 4:
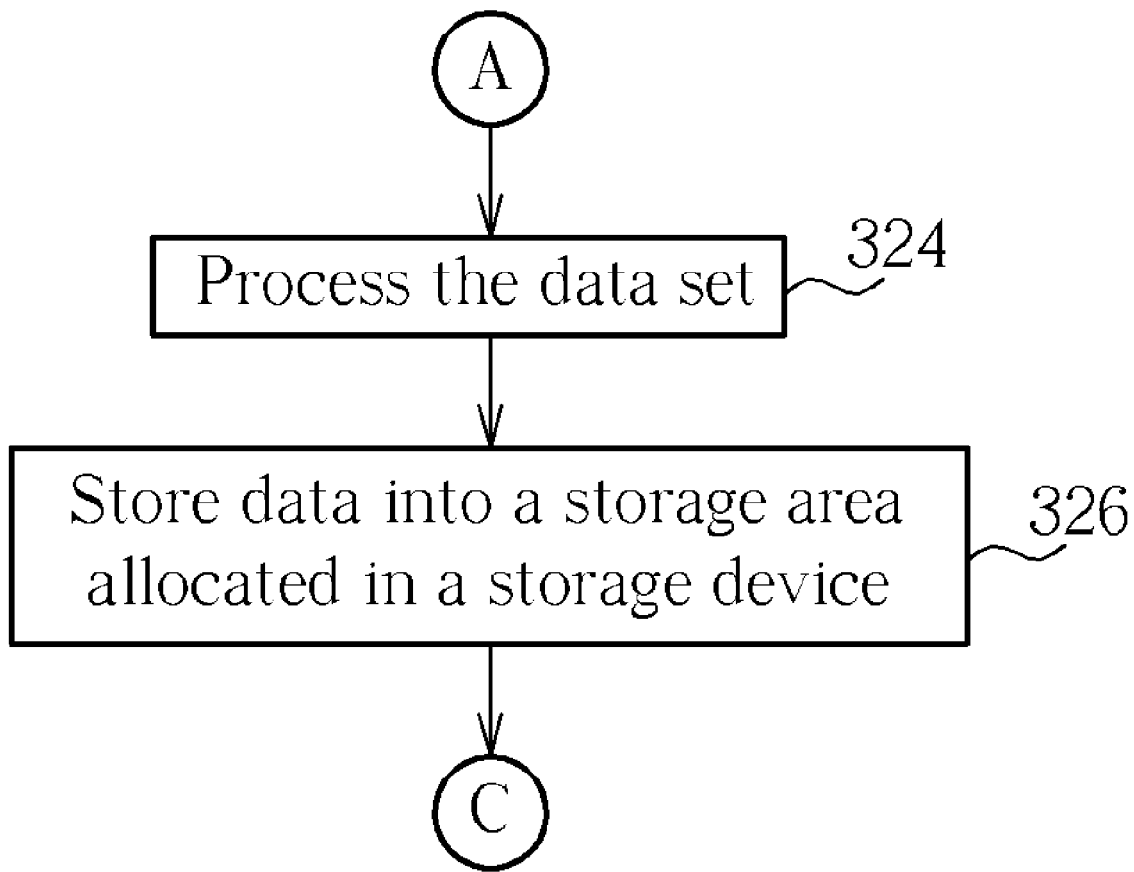
Figure 5:
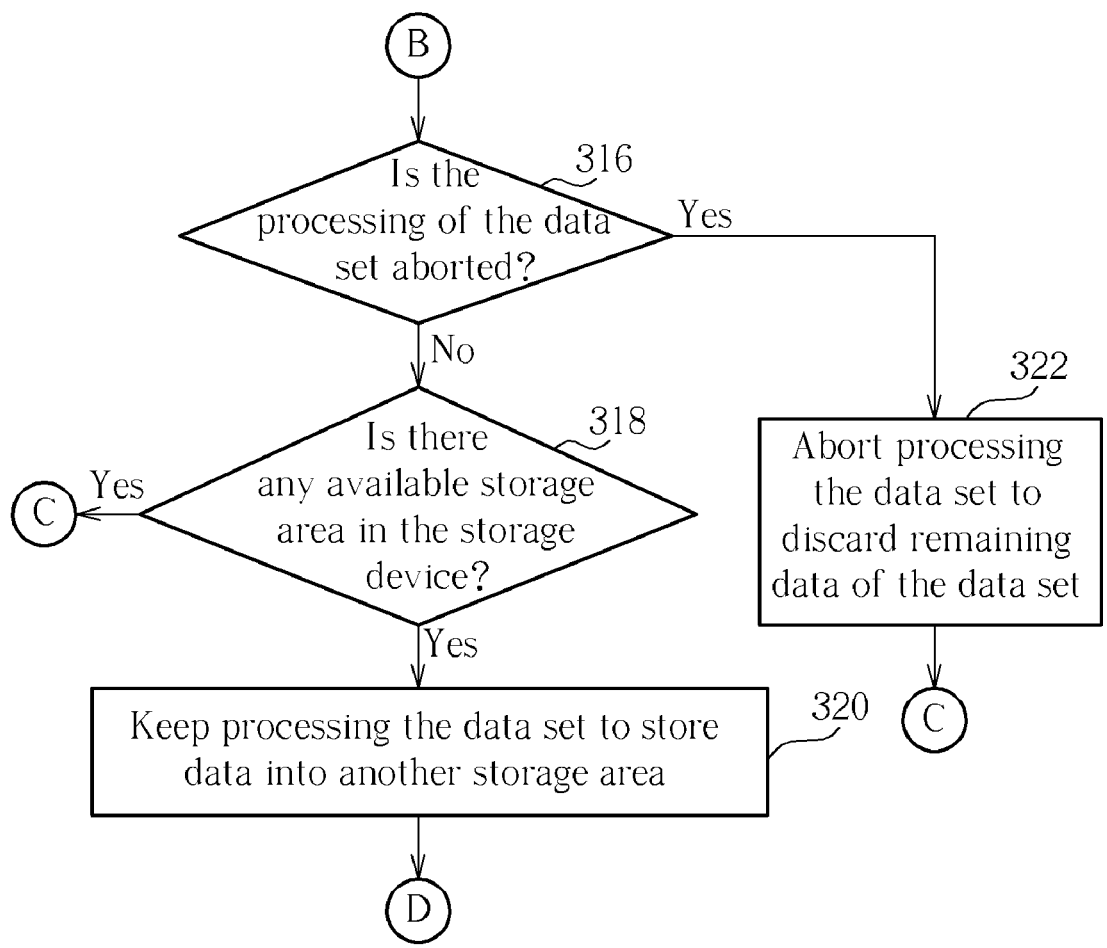

Please refer to FIG. 3 to FIG. 5, which show subsequent flowcharts of a method for processing a data stream including encoded data sets and raw data sets according to an embodiment of the present invention. Provided that substantially the same result is achieved, the steps of the flow need not be in the exact order shown and need not be contiguous; that is, other steps can be intermediate. The exemplary embodiment of the method according to the present invention includes the following steps:

Step 300: Receive a data set of the data stream.

Step 302: Generate an enable signal corresponding to a predetermined layer of the hierarchical layer structure when detecting that a data set of the data stream corresponds to the predetermined layer.

Step 304: Detect whether an identifier of the data set corresponds to one of predetermined raw data set identifiers when receiving the enable signal.

Step 306: Does the data set have a predetermined raw data set identifier? If yes, proceed to Step 308; if no, go to Step 328.

Step 308: Is the predetermined raw data set identifier an AFD identifier? If yes, proceed to Step 324; if no, go to Step 310.

Step 310: Process the data set.

Step 312: Store data into a storage area allocated in a storage device.

Step 314: Is the currently used storage area full? If yes, proceed to Step 316; if no, go to Step 312.

Step 316: Is the processing of the data set aborted? If yes, proceed to Step 322; if no, go to Step 318.

Step 318: Is there any available storage area in the storage device? If yes, proceed to Step 320; if no, go to Step 300 to continue processing the next data set.

Step 320: Continue processing the data set to store data into another storage area allocated in the storage device, and then go to Step 314.

Step 322: Abort processing the data set to discard the remaining data of the data set, and then go to Step 300 to continue processing the next data set.

Step 324: Process the data set.

Step 326: Store data into a storage area allocated in a storage device, and then go to Step 300 to continue processing the next data set.

Step 328: Discard the data set, and then go to Step 300 to continue processing the next data set.

For example, when the second processing circuit 104 determines that the predetermined raw data set identifier is the AFD identifier in Step 308 shown in FIG. 3, the third processing circuit 106 processes the data set (Step 324). Then, the third processing circuit 106 stores data extracted from the data set into a storage area SA_1 shown in FIG. 2 corresponding to the AFD identifier (Step 326), wherein the size of the AFD identifier is 16 bits, and thereby is less than 128 bytes (i.e. 128 bytes*8 bits=1024 bits). Thus, the SA_1 is not full, and the apparatus 10 receives a next incoming data stream to perform the aforementioned steps.

For example, when the second processing circuit 104 determines that the predetermined raw data set identifier is the non-AFD identifier in Step 308, the third processing circuit 106 processes the data set (Step 310). Then, the third processing circuit 106 stores data extracted from the data set into a storage area (e.g., SA_2 of FIG. 2) corresponding to the non-AFD identifier, wherein the storage area SA_2 is not full, and the third processing circuit 106 continues to store data extracted from the data set into a storage area SA_2 corresponding to the above-mentioned non-AFD identifier (Step 312). On the other hand, when the storage area SA_2 is full, the third processing circuit 106 determines that the processing of the data set is aborted (Step 316). When the result of Step 316 is yes, the third processing circuit 106 aborts processing the data set to discard the remaining data of the data set (Step 322), and then the process goes to Step 300 in FIG. 3 to continue processing the next data set. However, when the result of Step 316 is no, in Step 318, the third processing circuit 106 determines whether there is any available storage area in the storage device 108. When the result of the Step 318 is no, the process goes to Step 300 to continue processing the next data set. Contrarily, when the result of the Step 318 is yes, in Step 320, the third processing circuit 106 continue processing the data set to store data into another storage area allocated in the storage device, and then proceeds to Step 314.

Please refer to FIG. 6, which shows a diagram illustrating active format description (AFD) description table according to an embodiment of the present invention. As shown in FIG. 6, the AFD description table shows the layer that the AFD is extracted from, and the related information. Please note that the AFD description table is a conventional specification. Accordingly, since a skilled person can readily appreciate the operations of FIG. 6 after reading the above disclosure, further description is omitted here for the sake of brevity.

Please refer to FIG. 7, which shows a diagram illustrating user data description table according to an embodiment of the present invention. As shown in FIG. 7, the user data description table includes layer information, continuous flags and a size count of the user data. Please note that the user data description table is a conventional specification and accordingly, since a skilled person can readily appreciate the operations of FIG. 7 after reading the above disclosure, further description is omitted here for the sake of brevity.

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon.

Those skilled in the art will readily observe that numerous modifications and alterations of the device and method may be made while retaining the teachings of the invention.

What is claimed is:

1. An apparatus for processing a data stream including encoded data sets and raw data sets, the data stream having a hierarchical layer structure, the apparatus comprising:
    a first processing circuit, for generating an enable signal corresponding to a predetermined layer of the hierarchical layer structure when detecting that a data set of the data stream corresponds to the predetermined layer;
    a second processing circuit, coupled to the first processing circuit, for detecting whether an identifier of the data set corresponds to one predetermined raw data set identifier when receiving the enable signal from the first processing circuit; and
    a third processing circuit, wherein when the second processing circuit determines that the identifier of the data set corresponds to one predetermined raw data set identifier, the second processing circuit notifies the third processing circuit to process the data set, and when the second processing circuit fails to determine that the identifier of the data set corresponds to one predetermined raw data set identifier, the second processing circuit notifies the third processing circuit to discard the data set.

2. The apparatus of claim 1, further comprising a storage device including a plurality of storage areas allocated for storing data corresponding to a plurality of predetermined raw data set identifiers, respectively, wherein the third processing circuit processes the data set to store data into a storage area corresponding to the predetermined raw data set identifier, and when the storage area is full, the third processing circuit continues processing the data set to store data into another storage area in the storage device.

3. The apparatus of claim 1, further comprising a storage device including a plurality of storage areas allocated for storing data respectively corresponding to a plurality of predetermined raw data set identifiers, wherein the third processing circuit processes the data set to store data into a storage area corresponding to the predetermined raw data set identifier, and when the storage area is full, the third processing circuit aborts processing the data set to discard remaining data of the data set.

4. The apparatus of claim 1, wherein the data stream complies with a digital television specification.

5. The apparatus of claim 4, wherein the predetermined raw data set identifier is an active format description (AFD) identifier.

6. The apparatus of claim 4, wherein the predetermined raw data set identifier is a non-AFD identifier.

7. The apparatus of claim 1, wherein the data stream complies with an MPEG-2 specification.

8. The apparatus of claim 7, wherein the predetermined layer is selected from a group consisting of a sequence layer, a group of picture (GOP) layer, and a picture layer.

9. A method for processing a data stream including encoded data sets and raw data sets, the data stream having a hierarchical layer structure, the method comprising:
generating an enable signal corresponding to a predetermined layer of the hierarchical layer structure when detecting that a data set of the data stream corresponds to the predetermined layer;
detecting whether an identifier of the data set corresponds to one predetermined raw data set identifier when receiving the enable signal;
when determining that the identifier of the data set corresponds to one predetermined raw data set identifier, notifying a processing circuit to process the data set; and
when failing to determine that the identifier of the data set corresponds to one predetermined raw data set identifier, notifying the processing circuit to discard the data set.

10. The method of claim 9, further comprising:
allocating a plurality of storage areas for storing data corresponding respectively to a plurality of predetermined raw data set identifiers;
processing the data set to store data into a storage area corresponding to the predetermined raw data set identifier; and
when the storage area is full, continuing processing the data set to store data into another storage area in a storage device.

11. The method of claim 9, further comprising:
allocating a plurality of storage areas for storing data corresponding respectively to a plurality of predetermined raw data set identifiers;
processing the data set to store data into a storage area corresponding to the predetermined raw data set identifier; and
when the storage area is full, aborting processing the data set to discard remaining data of the data set.

12. The method of claim 9, wherein the data stream complies with a digital television specification.

13. The method of claim 12, wherein the predetermined raw data set identifier is an active format description (AFD) identifier.

14. The method of claim 12, wherein the predetermined raw data set identifier is a non-AFD identifier.

15. The method of claim 9, wherein the data stream complies with an MPEG-2 specification.

16. The method of claim 15, further comprising:
selecting the predetermined layer from a group consisting of a sequence layer, a group of picture (GOP) layer, and a picture layer.

* * * * *